United States Patent

Park

[11] Patent Number: 6,014,074
[45] Date of Patent: Jan. 11, 2000

[54] BINARY COMPARATOR

[75] Inventor: Sung Soo Park, Seoul, Rep. of Korea

[73] Assignee: LG Semicon Co., Ltd., Cheongju, Rep. of Korea

[21] Appl. No.: 09/071,863

[22] Filed: May 4, 1998

[30] Foreign Application Priority Data

Dec. 24, 1997 [KR] Rep. of Korea ............ 97-73463

[51] Int. Cl.⁷ .................................................. G06F 7/02
[52] U.S. Cl. ............................................... 340/146.2
[58] Field of Search ....................................... 340/146.2

[56] References Cited

U.S. PATENT DOCUMENTS 5,265,054  11/1993  McClure ............................ 365/200
5,376,829  12/1994  Rogers et al. ....................... 327/408
5,386,207  1/1995   Lin .................................... 340/146.2
5,592,142  1/1997   Adams et al. ...................... 340/146.2

*Primary Examiner*—Margaret R. Wambach
*Attorney, Agent, or Firm*—Fleshner & Kim

[57] ABSTRACT

A binary comparator for comparing two binary digits A and B includes multiple Equality Check Pass Gates (ECPGs E0-E3) connected serially to one another, for comparing the respective bit pairs from the least significant bit to the most significant bit of the binary digits A and B, two resistance units (P1, P2), two inverters (INV31, INV32) and multiple switching transistors, and is capable of obtaining the result of comparing the two binary digits A and B (A>B, A=B or A<B) in a short time due to the simple constitution thereof.

17 Claims, 2 Drawing Sheets

BINARY COMPARATOR

BACKGROUND OF THE INVENTION

1. Field of the Invention

The present invention is directed to a binary comparator, and in particular to a simply-constituted binary comparator capable of comparing two binary digits in a short time.

In the present specification, binary digits A and B ('A=$a_n a_{n-1} \ldots a_0$', 'B=$b_n b_{n-1} \ldots b_0$') are compared in the case that the number of bits is 4, that is, n is 3, as an example.

2. Description of the Background Art

FIG. 1 is a constitutional diagram of a binary comparator implemented with full adders in accordance with the conventional art. The conventional binary comparator includes: four inverters (INV3, INV2, INV1, INV0) for respectively inverting the logic states of each bit (b3, b2, b1, b0) of a binary digit B; full adders (ADD3, ADD2, ADD1, ADD0) to which the outputs of the inverters (INV3, INV2, INV1, INV0) and each bit of a binary digit A (a3, a2, a0, a1) are respectively inputted; inverters (INV13, INV12, INV11, INV10) for respectively inverting the outputs of the full adders (ADD3, ADD2, ADD1, ADD0); and an AND gate (AND10) for ANDing the outputs of the inverters (INV13, INV12, INVL11, INV10). The carry input of the full adder (ADD0) at the LSB location is always set to 1, and the carry is externally outputted from the full adder (ADD3) at the MSB location.

The operation of the above-mentioned binary comparator implemented with full adders in accordance with the conventional art will now be described. In order to explain the operation thereof easily, it is assumed that the binary digit A is $1011_2$ and the binary digit B is $1001_2$. Therefore, a3=1, a2=0, a1=1, a0=1 and b3=1, b2=0, b1=0, b0=1.

The bit 'a0=1', the bit '$\overline{b0}$=0' and the carry '1' are inputted to the full adder (ADD0). As a result, the sum and the carry values respectively become '0' and '1'. The sum '0' becomes '1' after being inverted in the inverter (INV10).

The bit 'a1=1' and the bit '$\overline{b1}$=1' are inputted to the full adder (ADD1), and the carry '1' is inputted from the full adder (ADD0) to the full adder (ADD1). Consequently, both the sum and the carry values become '1'. The sum '1' becomes '0' after being inverted in the inverter (IVN11).

The bit 'a2=0' and the bit '$\overline{b2}$=1' are inputted to the full adder (ADD2), and the carry '1' is inputted from the full adder (ADD1) to the full adder (ADD2). Accordingly, the sum and the carry values respectively become '0' and '1'. The sum '0' becomes '1' after being inverted in the inverter (INV12).

The bit 'a3=1' and the bit '$\overline{b3}$=0' are inputted to the full adder (ADD3), and the carry '1' is inputted from the full adder (ADD2) to the full adder (ADD3). As a result, the sum and the carry values respectively become '0' and '1'. The sum '0' becomes '1' after being inverted in the inverter (INV13). Here, the carry '1' is outputted externally. The carry '1' implies that the binary digit A is larger than the binary digit B.

The respective outputs '1', '1', '0' and '1' of the inverters (INV13, INV12, INV11, INV10) are ANDed in the AND gate (AND 10). Consequently, the output thereof becomes '0', which implies that the binary digits A and B are not equal.

As described above, the respective full adders in conjunction with the input inverters perform A–B operation, namely, a subtraction. In the case that the outputs of all full adders are '0', then A is equal to B. However, in the case the output of the carry is '1', then A is larger than B.

The operations performed above are represented by the following logic expressions.

$$(A=B) \equiv \overline{(a3 \oplus b3)} \cdot \overline{(a2 \oplus b2)} \cdot \overline{(a1 \oplus b1)} \cdot \overline{(a0 \oplus b0)} \quad (1)$$

$$(A>B) \equiv a3\overline{b3} + a2\overline{b2}\overline{(a3 \oplus b3)} + a1\overline{b1}\overline{(a3 \oplus b3)}\overline{(a2 \oplus b2)} + a0\overline{b0}\overline{(a3 \oplus b3)}\overline{(a2 \oplus b2)(a1 \oplus b1)} \quad (2)$$

Here, '$\oplus$' and '$\overline{(a_i \oplus b_i)}$' respectively represent an exclusive-OR operation and an exclusive-NOR operation.

Expression (1) implies that A is equal to B if the values of the respective bits are equal to each other. Expression (2) implies that the values of the bits a3 and b3 which are respectively MSB[s] of the binary digits A and B are compared, and then, if the values thereof (a3, b3) are equal to each other, the value of the bit a2 is compared with that of the bit b2, and if the values thereof (a2, b2) are equal, the value of the bit a1 is compared with that of the bit b1, and then, if the values thereof (a1, b1) are equal, the value of the bit a0 is compared with the value of the bit b0.

The entire operation speed of the circuit is determined by the full adder thereof. However, the above four full adders are complex in constitution because they include multiple transistors.

FIG. 2 is a constitutional diagram of a binary comparator implemented with logic gates in accordance with the conventional art. The constitution of the binary comparator in FIG. 2 is simpler than that of the binary comparator in FIG. 1 because the binary comparator illustrated in FIG. 2 is constituted by using the boolean properties represented in Expressions (1) and (2).

As shown in FIG. 2, the binary comparator includes four NOR gates (NOR3, NOR2, NOR1, NOR0), four AND gates (AND23, AND22, AND21, AND20), and an OR gate (OR).

The Nor gate (NOR3) performs the exclusive-NOR operation '$\overline{(a_3 \oplus b_3)}$' upon the input bits ($a_3$, $b_3$) and the other NOR gates (NOR2–NOR0) also perform exclusive-NOR operations upon the input bits ($a_2$, $b_2$) ($a_1$, $b_1$) ($a_0$, $b_0$), respectively.

The respective outputs of the four NOR gates (NOR3–NOR0) are ANDed in the AND gate (AND20). The operation performed in the AND gate (AND 20) is represented in the above logic expression (1).

That is, the AND gates (AND23, AND22, AND21) respectively perform the operations '$a_2 \overline{b_2}\overline{(a_3 \oplus b_3)}$', '$a_1 \overline{b_1}\overline{(a_3 \oplus b_3)}(a_2 \oplus b_2)$' and '$a_0 \overline{b_0}\overline{(a_3 \oplus b_3)}\overline{(a_2 \oplus b_2)}\overline{(a_1 \oplus b_1)}$'. In addition, the operation performed in the OR gate (OR) is represented by the above logic expression (2).

However, the constitution of the binary comparator adopting the logic gates in accordance with the conventional art illustrated in FIG. 2 is also complex due to the multiple transistors. Accordingly, the binary comparators described above have a disadvantage in that the operation speed thereof is slow.

SUMMARY OF THE INVENTION

It is an object of the present invention to provide a binary comparator whose operation speed is fast, by using a small number of transistors.

An object of the present invention is to provide a binary comparator that substantially overcomes one or more problems caused by limitations or disadvantages of the background art.

In order to achieve the above-described object, in accordance with the present invention, there is provided a binary comparator for comparing two binary digits A and B (A=$a_n a_{n-1} \ldots a_0$, B=$b_n b_{n-1} \ldots b_0$) having the identical number of bits which includes:

first and second resistance units (P1, P2) with their one sides respectively connected to a power supply voltage;

multiple Equality Check Pass Gates (hereinafter, "ECPG") (En–E0) as many as the respective bits of the two binary digits A and B connected serially between the other side of the first resistance unit (P1) and ground, for comparing the respective bits $(a_n, b_n), (a_{n-1}, b_{n-1}), \ldots, (a_0, b_0)$ of the two binary digits A and B;

a first inverter (INV31) connected to a junction of the first resistance unit (P1) and the ECPG (E0) comparing the lowest bits of A and B $(a_0, b_0)$, for inverting a level of an input signal and outputting it externally;

multiple switching transistors (Nn–N0) respectively connected between the other side of the second resistance unit (P2) and the other sides of the multiple ECPGs, for being switched by the AND-combined values '$(a_n\overline{b_n})(a_{n-1}\overline{b_{n-1}}), \ldots, (a_0\overline{b_0})$' of the respective bit values of the binary digit A and the inverted binary digit $\overline{B}$; and a second inverter (INV32) connected to a junction of the other side of the second resistance unit (P2) and the multiple switching transistors (Nn–N0), for inverting a level of an input signal and outputting it externally.

To further achieve the above objects in a whole or in parts, there is provided a comparator that compares first and second binary signals according to the present invention that includes substantially claim 12.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

The present invention will now be explained based on FIGS. 3 and 4. The two binary digits A and B are respectively expressed as '$A=a_n, a_{n-1} \ldots a_0$' and '$B=b_n b_{n-1} \ldots b_0$'. The case for 'n' being 3 is given as an example in the present specification.

Figure 3:
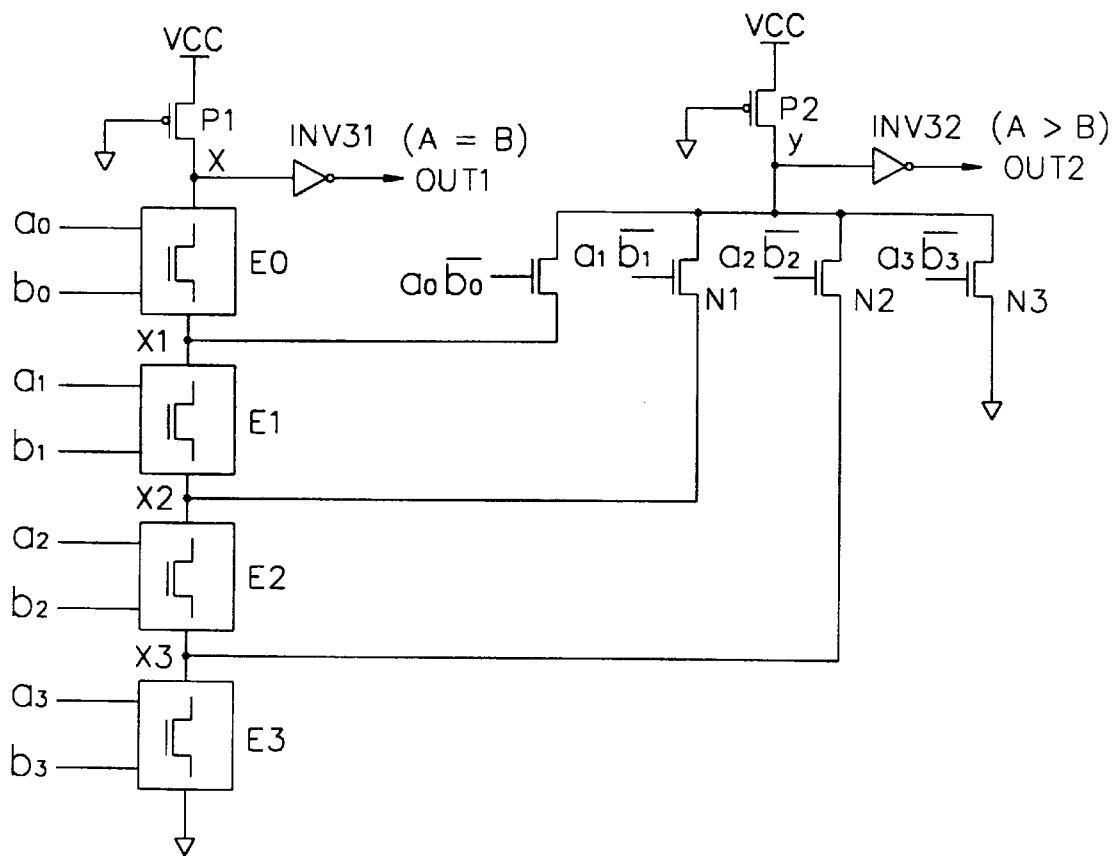
FIGS. 3 is a constitutional diagram illustrating a preferred embodiment of a binary comparator in accordance with the present invention.

FIG. 3 is a constitutional diagram illustrating a preferred embodiment of a binary comparator in accordance with the present invention. As shown in FIG. 3, the source of a first PMOS transistor (P1) is connected to a power supply voltage (Vcc), the gate thereof is grounded, and four equality check pass gates (hereafter ECPGs) are serially connected between the drain of the PMOS transistor (P1) and ground. First through fourth ECPGs are labeled (E0, E1, E2, E3) in FIG 3. Bits '$a_0$' and '$b_0$' are inputted to the first ECPG (E0), '$a_1$' and '$b_1$' are inputted to the second ECPG (E1), '$a_2$' and '$b_2$' are input to the third ECPG (E2) and, '$a_3$' and '$b_3$' are inputted to the fourth ECPG (E3). A first inverter (INV31) is connected between the drain of the PMOS transistor (P1) and a first output terminal (OUT1).

In addition, the source of a second PMOS transistor (P2) is connected to the power supply voltage (Vcc), the gate thereof is grounded, and the drains of four NMOS transistors (N0–N3) are commonly connected together to a node (y), namely, the drain of the second PMOS transistor (P1).

The source of the NMOS transistor (N0) is connected to a junction (node x1) between the first ECPG (E0) and the second ECPG (E1), and the value '$a_0\overline{b_0}$' is inputted to the gate of the NMOS transistor (N0). The source of the second NMOS transistor (N1) is connected to a junction (node x2) between the second ECPG (E1) and the third ECPG (E2), and the value '$a_1\overline{b_1}$' is inputted to the gate of the NMOS transistor (N1). The source of the third NMOS transistor (N2) is connected to a junction (node x3) between the third ECPG (E2) and the fourth ECPG (E3), and the value '$a_2\overline{b_2}$' is inputted to the gate of the NMOS transistor (N2). The source of the fourth NMOS transistor (N3) is connected to ground, and the value '$a_3\overline{b_3}$' is inputted to the gate of the NMOS transistor (N3).

The above-described two PMOS transistors (P1, P2) operate as resistance units.

A second inverter (INV32) is connected between the drain of the PMOS transistor (P2) and a second output terminal (OUT2).

Figure 4:
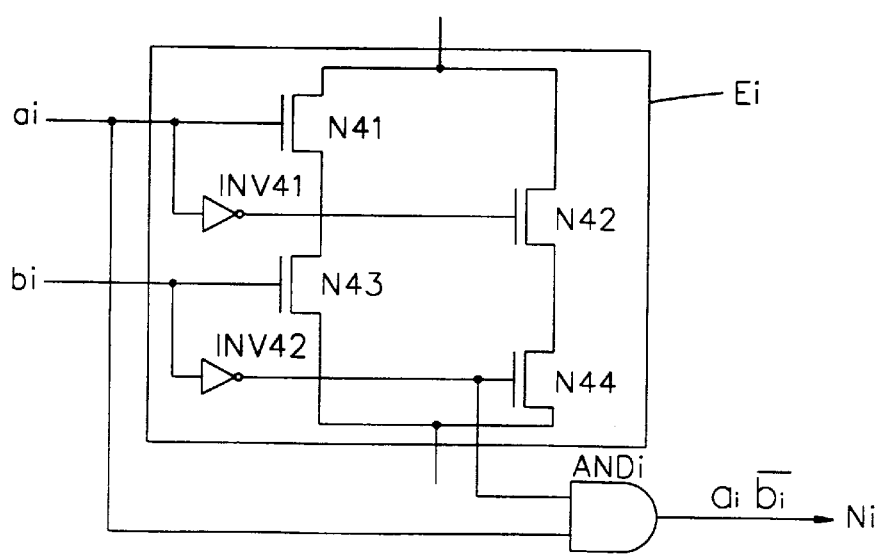
FIG. 4 is a detailed circuit diagram of the respective parts of the binary comparator illustrated in FIG. 3.

FIG. 4 illustrates the detailed constitutional diagram of a preferred embodiment of each of the ECPGs (E0–E3) and AND gates (AND0–AND3) for obtaining the bit values which are respectively outputted from the ECPGs (E0–E3) and applied to the gates of the four NMOS transistors (N0–N3). As shown in FIG. 4, the four ECPGs (E0–E3) are turned on or off pursuant to the input bit values $(a_0, b_0) (a_1, b_1) (a_2, b_2) (a_3, b_3)$ like a switch. That is, if the logic states of the two inputs, $a_i$ and $b_i$, are equal, the ECPG concerned is turned on, and if the logic states thereof are different, it is turned off.

In addition, the respective bits $(a_i)$ of the binary digit A are inputted to one input terminal of the respective AND gates (AND0–AND3), and the inverted values of the respective bits $(b_i)$ of the binary digit B are respectively inputted to the other input terminals of the AND gates (AND0–AND3). The output terminals of the AND gates (AND0–AND3) are connected to the respective gates of the four NMOS transistors (N0–N3).

The operation of the preferred embodiment of the binary comparator of FIG. 3 according to the present invention will now be described.

If the values of the inputs A and B are equal, that is, if $(a_0, b_0) (a_1, b_1) (a_2, b_2) (a_3, b_3)$ are each respectively equal, the four ECPGs (E0, E1, E2, E3) are all turned on. Accordingly, the node (x) is at a ground level and the output terminal (OUT1) is rendered to a logic level of '1' by the inverter (INV 31) whose input terminal is connected to the node (x). The level '1' at output terminal (OUT1) implies that the value of the binary digit A is equal to that of the binary digit B (A=B).

On the other hand, if the two inputs, A and B are not equal, one or more among the four ECPGs (E0, E1, E2, E3) is not turned on. If '$a_3$' is different from '$b_3$', the fourth ECPG (E3) is turned off. In the case that '$a_3$' is greater than '$b_3$', the fourth NMOS transistor (N3) is turned on, the level of the node (y) is thereby at ground level and the level at output terminal (OUT2) is transited to '1'.

If '$a_3$' is equal to '$b_3$', the fourth ECPG (E3) is turned on. If '$a_2$' is different from '$b_2$', the third ECPG (E2) is turned off. In the case that '$a_2$' is greater than '$b_2$' the third NMOS transistor (N2) is turned on, the node (y) is at ground level and the output terminal (OUT2) is transited to '1'.

The second ECPG (E1) and the second NMOS transistor (N1), and the first ECPG (E0) and the first NMOS transistor (N0) are also operated respectively in the same way as described above, pursuant to the logic states of '$a_1$ and $b_1$' and '$a_0$ and $b_0$'.

The above-described case where the two inputs A and B are not equal will now be explained by separating it into the cases that the input A is greater than the input B and that the input A is smaller than the input B. First, the case that the input A is greater than the input B is described below.

It is assumed that the binary digits A and B are $1011_2$ and $1001_2$, respectively. Accordingly, a3=1, a2=0, a1=1, a0=1 and b3=1, b2=0, b1=0, b0=1.

The fourth ECPG (E3), the third ECPG (E2) and the first ECPG (E0) are turned on. As the two inputs of the second ECPG (E1), '$a_1$' and '$b_1$' are not equal, the second ECPG (E1) is turned off. Accordingly, the node (x) is at a power supply voltage level and the output terminal (OUT1) is at a level of '0'.

In addition, the input '$a_1$' is inputted to the AND gate (AND1) and the inverted input '$b_1$' is inputted to the AND gate (AND1). Therefore, the output of the AND gate (AND1), '$a_1\overline{b_1}$' is at a high level and thus, the second NMOS transistor (N1) is turned on. The remaining three AND gates (N0, N2, N3) are turned off by the values $a_0\overline{b_0}$, $a_2\overline{b_2}$, $a_3\overline{b_3}$ respectively inputted thereto. Accordingly, the node (y) is at a ground level and the output terminal (OUT2) is rendered to a level of '1'. Consequently, if the level of the output terminal (OUT2) is '1', it implies that the binary digit A is greater than the binary digit B (A>B).

The contrary case where the binary digit A is smaller than the binary digit B is next explained. It is assumed that the binary digits A and B are respectively $1001_2$ and $1011_2$. The operations of the elements except for the second NMOS transistor (N1) are identical to the operations described previously when the binary digits A and B are $1011_2$ and $1001_2$, respectively. The value '$a_1\overline{b_1}$' inputted to the second NMOS transistor (N1) is at a low level and the node (y) is at the power supply voltage level (Vcc). Accordingly, the output terminal (OUT2) is set to a level of "0". Consequently, if the levels of the output terminals (OUT1, OUT2) are both '0', it implies that the binary digit A is smaller than the binary digit B (A<B).

As described so far, the values A and B compared above have four bits, respectively. If the number of bits of A and B are respectively five, a fifth ECPG would be serially connected to the four ECPGs (E0–E3) additionally, a fifth transistor would be connected in parallel with the four transistors (N0–N3), and an AND gate would be connected additionally between the added ECPG and transistor.

That is, an ECPG would be connected additionally between the node (x) and the first ECPG (E0) illustrated in FIG. 3. A transistor would be added between a junction of the added ECPG and the first ECPG (E0) and the node (y). And, an AND gate would be added between the added ECPG and transistor, as illustrated in FIG. 4.

Therefore, in order to compare two values whose numbers of bits are identically 'n', the binary comparator in accordance with the present invention includes two inverters, 'n' ECPGs and 'n' NMOS transistors.

Figure 1:
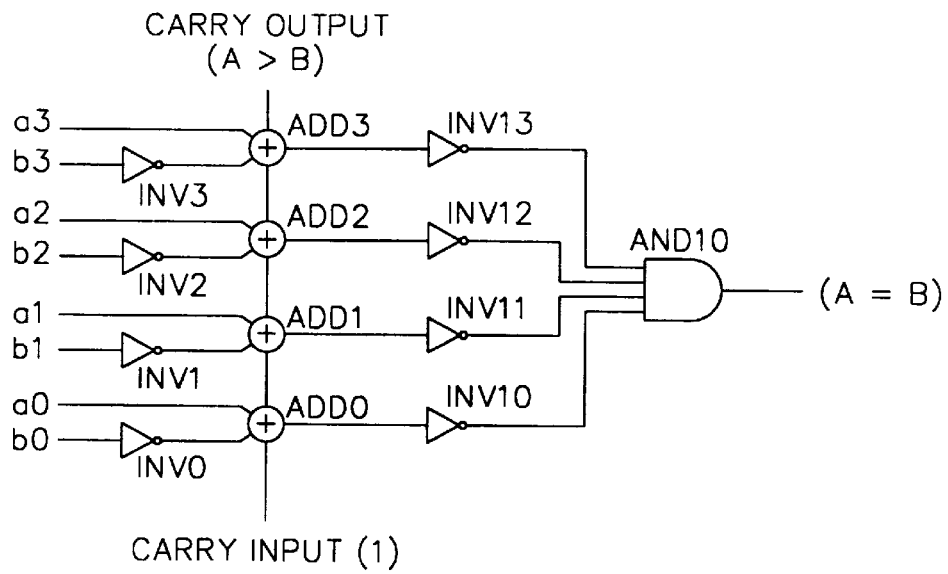
FIG. 1 is a constitutional diagram of a binary comparator implemented with full adders in accordance with the conventional art.
Figure 2:
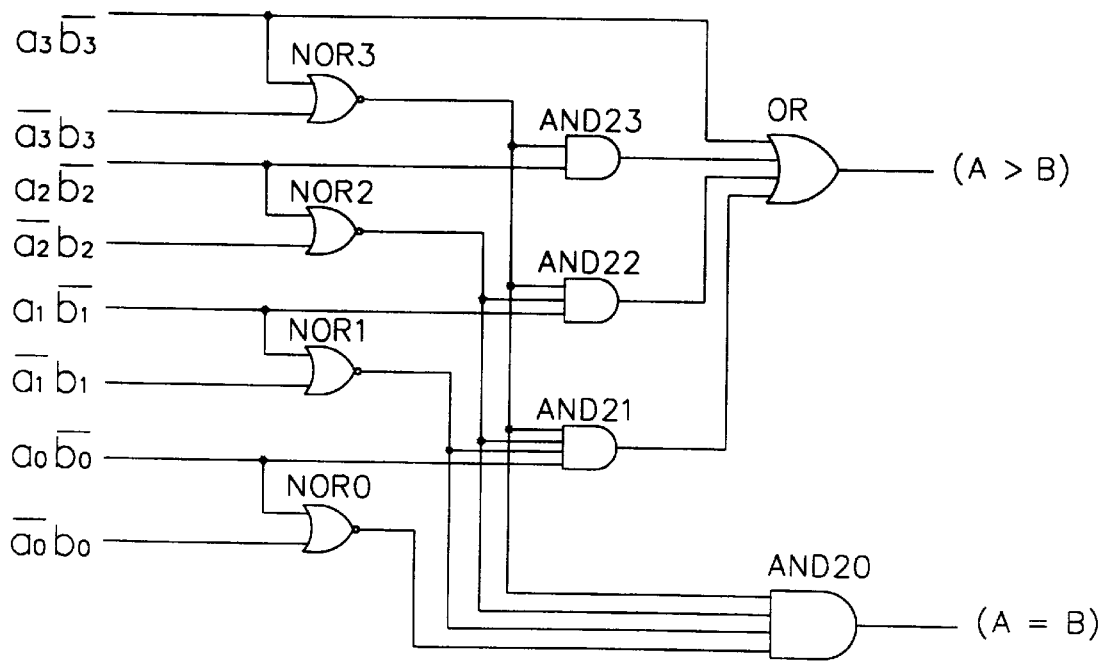
FIG. 2 is a constitutional diagram of a binary comparator implemented with logic gate elements in accordance with the conventional art.

The number of the transistors used in the preferred embodiment of the binary comparator of FIG. 3 according to the present invention is one third the number of the transistors used in the comparator of FIG. 2 in accordance with the conventional art.

In addition, the time for obtaining the output 'A=B' is similar in the conventional art and the preferred embodiment of the binary comparator according to the present invention. However, it is faster to obtain the output 'A>B' in accordance with the preferred embodiment of the binary comparator according to the present invention than in the conventional art.

As the present invention may be embodied in several forms without departing from the spirit of essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A binary comparator for comparing first and second binary digits, comprising:
   first and second resistance units each having one side respectively coupled to first and second reference voltages;
   a plurality of comparators connected serially between the other side of the first resistance unit and a third reference voltage, wherein the plurality of comparators is equal in number to a number of bits of the first and second binary digits;
   a first inverter coupled to the other side of the first resistance unit and an output of a first comparator of the plurality of comparators that inputs the least significant bits of the first and second binary digits, respectively, and wherein the first inverter outputs a first output signal;
   a plurality of switching transistors each connected respectively between the other side of the second resistance unit and an input node of a corresponding one of the plurality of comparators, wherein the transistors are switched by control signals that result from a logical combination of the corresponding bit pairs of the first binary digit and the second binary digit; and
   a second inverter coupled to the other side of the second resistance unit, wherein the second inverter outputs a second output signal.

2. The binary comparator of claim 1, wherein the first and second resistance units are PMOS transistors each having control electrodes connected to ground.

3. The binary comparator of claim 1, wherein each of the comparators is turned on when two bits inputted thereto are equal, and wherein said each of the comparators is turned off when the two bits inputted thereto are different.

4. The binary comparator of claim 1, wherein the switching transistors are NMOS transistors.

5. The binary comparator of claim 1, further comprising:
   an inverter circuit that inverts each bit of the second binary digit; and
   an AND circuit that respectively ANDs each corresponding bit of the first binary digit with the inverted bit of the second binary digit output by the inverter circuit, wherein the control signals are output by the AND circuit.

6. The comparator of claim 1, wherein each of the comparators is an equality check pass gate having an input and an output, and wherein each of the equality check pass gates comprises:
   a first pair of transistors coupled in series between the input and the output;
   a second pair of transistors coupled between the input and the output, wherein a control electrode of the first pair of transistors receives a corresponding bit pair of the first and second binary digits, respectively, and wherein the second pair of transistors receives an inverted corresponding bit pair, respectively.

7. A comparator that compares first and second signals of a prescribed number of bits, the comparator comprising:

a plurality of bit comparators coupled in series, wherein a first bit comparator is coupled to a first reference voltage and an output of a last bit comparator is coupled to a first output terminal;

a plurality of switches coupled in parallel to a second output terminal, wherein each of the switches is coupled between the second output terminal and an input of a corresponding one of the plurality of bit comparators.

8. The comparator of claim 7, wherein the prescribed number of bits of the first and second signals are equal to each other and greater than zero.

9. The comparator of claim 7, wherein each of the bit comparators receives a corresponding bit pair of the first and second signals, and wherein said each of the bit comparators is a circuit that passes a signal received at an input to an output when the received bit pair is equal.

10. The comparator of claim 9, wherein said each of the bit comparators is an equality check pass gate, wherein each of the equality check pass gates comprises:

a first pair of transistors coupled in series between the input and the output;

a second pair of transistors coupled between the input and the output, wherein control electrodes of the first pair of transistors receive the corresponding bit pair, respectively, and wherein control electrodes of the second pair of transistors receive an inverted corresponding bit pair, respectively.

11. The comparator of claim 7, wherein each of the bit comparators is an equality check pass gate, wherein each of the equality check pass gates comprises:

a first pair of transistors coupled in series between an input and an output;

a second pair of transistors coupled between the input and the output, wherein control electrodes of the first pair of transistors receive the corresponding bit pair, respectively, and wherein control electrodes of the second pair of transistors receive an inverted corresponding bit pair, respectively.

12. The comparator of claim 7, wherein the switches are transistors having second electrodes coupled to the second output terminal, and control electrodes that receive a result of a logic combination of the corresponding bit pair.

13. The comparator of claim 12, wherein at least one of the transistors is enabled when the bits of the first signal are greater than the bits of the second signal.

14. The comparator of claim 12, wherein the control electrode of each of the plurality of transistors receives a result of a logical AND operation of the bit of the first signal and an inverse of the bit of the second binary signal.

15. The comparator of claim 7, further comprising first and second resistance units coupled between a second reference voltage and the first and second output terminals, respectively, wherein the first reference voltage is ground, and wherein the second reference voltage is a supply voltage.

16. The comparator of claim 15, wherein first and second output terminals are set to a first level, wherein the first level is not equal to the first and second reference voltages.

17. The comparator of claim 7, further comprising first and second inverters having inputs coupled to the first and second output terminals, respectively.

* * * * *